Sept. 8, 1936.  C. L. HENRY  2,053,790
BALL AND SOCKET BEARING
Filed April 16, 1934
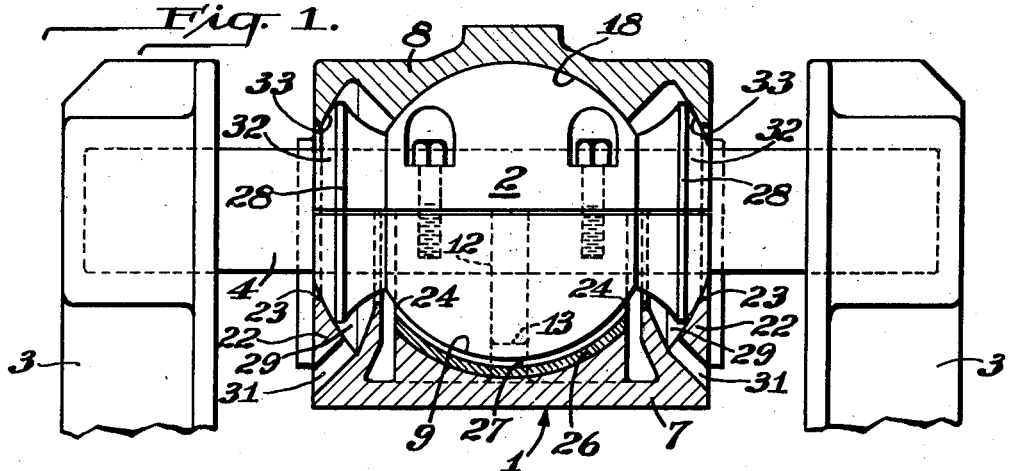
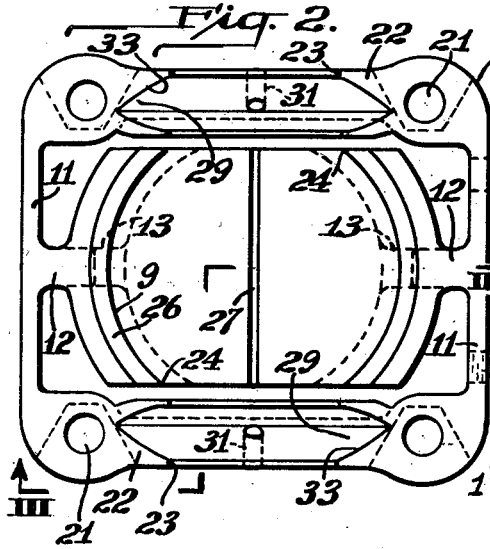
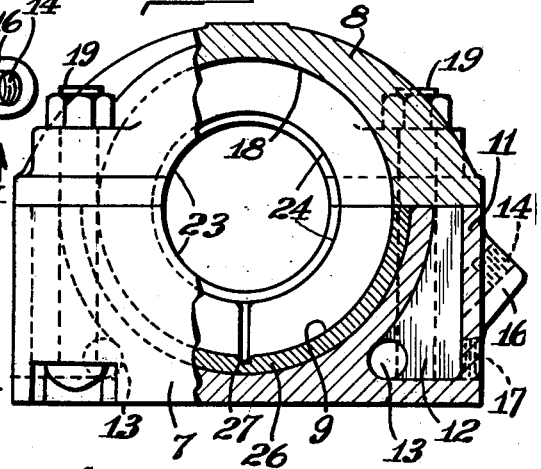
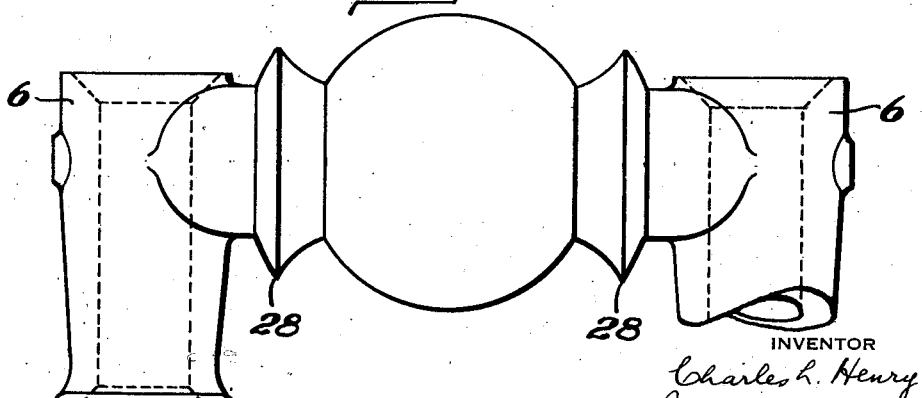
INVENTOR
Charles L. Henry
By Brown, Critchlow & Flick
his Attorneys.
WITNESSES Patented Sept. 8, 1936

2,053,790

UNITED STATES PATENT OFFICE 2,053,790

BALL AND SOCKET BEARING

Charles L. Henry, Pittsburgh, Pa., assignor to Lee C. Moore & Company, Inc., Pittsburgh, Pa., a corporation of Pennsylvania Application April 16, 1934, Serial No. 720,725

9 Claims. (Cl. 308—21)

This invention relates to bearings, and more particularly to ball and socket bearings adapted to be exposed to rain and snow.

In certain types of ball and socket bearings the socket is disposed in an oil reservoir, whereby the contacting surfaces of the socket and ball are immersed in oil. When such a bearing is used in the open air, in connection with oil-well equipment for instance, it is provided with a cap member which covers the ball and reservoir to form a bearing-housing in an attempt to keep rain and snow from entering the oil reservoir. However, the openings through the walls of the housing, through which extend shafts or like members that are connected to the ball, must be of substantially greater diameter than the shafts in order not to restrain movement of the ball in any direction relative to its socket. In a driving rain or snow storm, rain or snow is driven through these enlarged openings and enters the oil reservoir where it contaminates the oil. The result is that the bearing surfaces are improperly lubricated, and are exposed to corrosion and wear.

It is among the objects of this invention to provide a bearing into the oil reservoir of which rain and snow can not enter. Another object is to provide such a bearing in which no packing is required for keeping out rain and snow. Further objects are to provide a rain-proof ball and socket bearing in which there is substantially no wear, which requires no attention other than occasionally filling the oil reservoir, and which is relatively inexpensive and simple in construction.

The preferred embodiment of the invention is illustrated in the accompanying drawing, in which Fig. 1 is a side view of the bearing with the bearing-housing shown in vertical section; Fig. 2 a plan view of the bottom member of the housing; Fig. 3 an end view of the bearing-housing, partly in section, taken on the line III—III of Fig. 2; and Fig. 4 a side view of a modified form of ball member.

Referring to Fig. 1 of the drawing, a bearing is provided comprising a bearing-housing 1 with a ball 2 movably disposed therein. The bearing is of a type especially suitable for oil well equipment where it is exposed to all kinds of weather, including rain and snow. When thus used, the bearing-housing is, for example, rigidly mounted on one end of a walking beam, and the forks 3 of a pitman stirrup rigidly connected to the ends of shafts 4 projecting from diametrically opposite portions of the ball. Preferably, these shafts are the opposite end-portions of a single shaft extending through the ball, the ball being formed in semi-spherical halves suitably bolted together and to the shaft.

On the other hand, if desired, the shafts can be made integral with the ball, as shown in Fig. 4, and may be provided at their outer ends with integral tubular members 6 from which pumping rod reins can be suspended. In such a case, the bearing is mounted on the end of a walking beam opposite to that on which it would be mounted if it were operably connecting a pitman to the beam.

Again referring to the embodiment of the invention shown in the first three figures of the drawing, the bearing-housing consists of a lower member or oil reservoir 7, and an upper member or cap 8. As indicated, the lower member forms a reservoir adapted to contain a supply of oil for lubricating a ball-receiving socket 9 with which it is provided and in which ball 2 is movably disposed. The sides of the socket extend upward to the top of the reservoir (Fig. 3) and are joined to the side walls 11 of the reservoir by a pair of vertical ribs 12 integral therewith. The lower portion of each rib is provided with an aperture 13 through which oil can flow from one end of the reservoir to the other when it is filled or tilted endways.

Oil is introduced into the reservoir through a port 14 extending through a side wall thereof and obliquely upward through a boss 16 integral with that wall. The reservoir is drained through a normally closed tap 17 in the bottom of a side wall.

The upper member or cap 8 of the housing, shown in Figs. 1 and 3, is provided with a socket 18 which fits over the upper portion of the ball. The side and end walls of the cap rest on the walls of the oil reservoir to which the cap is suitably connected, such as by bolts 19 disposed in vertical bores 21 through the corners of the housing (Fig. 3). The sides of the housing are sealed against the entrance of rain and snow by means of gaskets, not shown, disposed between the side walls of the cap and reservoir.

The end walls 22 of the housing are provided with circular openings 23 through which shafts 4 extend, and the ends of each socket are provided with semi-circular recesses 24 for the same purpose. The recessed ends of socket 9 are spaced from the end walls of the oil reservoir in order to permit oil to enter the socket through the lowermost portions of its recesses 24. To aid in thus lubricating socket 9 the layer of babbitt 26, of which its bearing surface is composed, is provided with an oil groove 27 extending from end to end of the socket through its lowest points.

Openings 23 and recesses 24 have a somewhat greater diameter than the shafts 4 in order not to restrict universal movement of the shafts therein, which would prevent the ball from aligning itself with the pitman or pumping rod. Although the ball is substantially enclosed by the housing, these necessary enlarged openings at the end of the housing leave a space around each shaft through which the wind could drive rain and snow into the oil reservoir where it would contaminate the oil and cause improper lubrication, corrosion and wear of the bearing surfaces. The means by which rain and snow is prevented from entering the oil reservoir through these openings is the principal feature of this invention.

To that end, therefore, each end of the shaft is provided adjacent the ball with an annular drip flange 28. The end walls of the housing, which are rather thick, are provided with annular recesses 29 extending radially outward from the walls of the enlarged housing openings 23 for receiving the drip flanges. The diameter of the flanges is greater than the diameter of the openings so that rain and snow driven into the openings strikes the flanges by which it is deflected and caused to run down to the bottoms of the flanges from which it drips into the annular recesses. To drain the water from these recesses, the outer portions of end walls 22 are provided with drains 31 leading to the atmosphere. Recesses 29 are large enough to permit the flanges to move in all directions therein without restriction.

To more effectively prevent entrance of rain and snow into the oil reservoir, the outer faces 32 of the flanges and the outer faces 33 of the annular recesses 29 are formed as portions of spheres concentric with ball 2, whereby the slight clearance between the outer face of each flange and the adjacent face of the annular recess remains constant regardless of the position of the ball in its socket.

A bearing constructed in accordance with this invention can be used in the open under any weather conditions without danger of its functioning improperly or of its becoming damaged by excessive wear and corrosion. The drip flanges with which the bearing is provided effectively prevent rain and snow from entering the oil reservoir of the bearing, but do not interfere with relative movement between the ball and socket. Another advantage of this invention is that no packing is required for keeping out the rain and snow, which eliminates the necessity of packing adjustments and replacements. As long as the oil reservoir of this bearing is supplied with the proper amount of oil, the bearing will require substantially no other attention to keep it in perfect operating condition.

According to the provisions of the patent statutes, I have explained the principle of my invention and have described what I now consider to represent its best embodiment. However, I desire to have it understood that, within the scope of the appended claims, the invention may be practiced otherwise than as specifically described.

I claim:

1. A ball and socket bearing comprising a bearing-housing adapted to be mounted on one end of a walking beam, the lower portion of the housing forming an oil reservoir provided with a ball-receiving socket adapted to be lubricated by oil in the reservoir, a ball disposed in the socket, shaft ends projecting from diametrically opposite portions of the ball and adapted to support a vertically movable member below them, the end walls of the housing being provided with enlarged openings through which the shaft ends extend, and an annular drip flange projecting from each of the shaft ends adjacent the ball to deflect rain and snow driven into said enlarged openings, said end walls of the housing being provided with recesses extending radially outward from said openings for receiving the flanges for unrestricted movement therein, and the bottoms of the recesses having drains opening to the atmosphere, whereby rain and snow are prevented from entering the oil reservoir.

2. A ball and socket bearing comprising a bearing-housing adapted to be mounted on one end of a walking beam, the lower portion of the housing forming an oil reservoir provided with a ball-receiving socket adapted to be lubricated by oil in the reservoir, a ball disposed in the socket, shaft ends projecting from diametrically opposite portions of the ball and adapted to support a vertically movable member below them, the end walls of the housing being provided with enlarged openings through which the shaft ends extend, and an annular drip flange projecting from each of the shaft ends adjacent the ball to deflect rain and snow driven into said enlarged openings, said end walls of the housing being provided with recesses extending radially outward from said openings for receiving the flanges for unrestricted movement therein, the bottoms of the recesses having drains opening to the atmosphere, and the diameter of the flanges being greater than the diameter of the housing openings, whereby rain and snow are prevented from entering the oil reservoir.

3. A ball and socket bearing comprising a bearing-housing adapted to be mounted on one end of a walking beam, the lower portion of the housing forming an oil reservoir provided with a ball-receiving socket adapted to be lubricated by oil in the reservoir, a ball disposed in the socket, shaft ends projecting from diametrically opposite portions of the ball and adapted to support a vertically movable member below them, the end walls of the housing being provided with enlarged openings through which the shaft ends extend, and an annular drip flange projecting from each of the shaft ends adjacent the ball to deflect rain and snow driven into said enlarged openings, the outer faces of the flanges being formed as portions of a sphere concentric with the ball, said end walls of the housing being provided with recesses extending radially outward from said openings for receiving the flanges for unrestricted movement therein, and the bottoms of the recesses having drains opening to the atmosphere, whereby rain and snow are prevented from entering the oil reservoir.

4. A ball and socket bearing comprising a bearing-housing adapted to be mounted on one end of a walking beam, the lower portion of the housing forming an oil reservoir provided with a ball-receiving socket adapted to be lubricated by oil in the reservoir, a ball disposed in the socket, shaft ends projecting from diametrically opposite portions of the ball and adapted to support a vertically movable member below them, the end walls of the housing being provided with enlarged openings through which the shaft ends extend, and an annular drip flange projecting from each of the shaft ends adjacent the ball to deflect rain and snow driven into said enlarged openings, said end walls of the housing being provided with recesses extending radially outward from said openings for receiving the flanges for unrestricted movement therein, the outer faces of the recesses being formed as portions of a sphere concentric with the ball, and the bottoms of the recesses having drains opening to the atmosphere, whereby rain and snow are prevented from entering the oil reservoir.

5. A ball and socket bearing comprising a bearing-housing adapted to be mounted on one end of a walking beam, the lower portion of the housing forming an oil reservoir provided with a ball-receiving socket adapted to be lubricated by oil in the reservoir, a ball disposed in the socket, shaft ends projecting from diametrically opposite portions of the ball and adapted to support a vertically movable member below them, the end walls of the housing being provided with enlarged openings through which the shaft ends extend, and an annular drip flange projecting from each of the shaft ends adjacent the ball to deflect rain and snow driven into said enlarged openings, said end walls of the housing being provided with recesses extending radially outward from said openings for receiving the flanges for unrestricted movement therein, and the bottoms of the recesses having drains opening to the atmosphere, whereby rain and snow are prevented from entering the oil reservoir, the outer faces of the flanges and recesses being formed as portions of spheres concentric with the ball, and said outer faces of said flanges being disposed to seat against the outer faces of said recesses.

6. A ball and socket bearing comprising a two-part bearing-housing adapted to be mounted on one end of a walking beam, the lower part of the housing forming an oil reservoir provided with a ball-receiving socket adapted to be lubricated by oil in the reservoir, a ball disposed in the socket, shaft ends projecting from diametrically opposite portions of the ball and adapted to support a vertically movable member below them, the end walls of the housing being provided with enlarged openings through which the shaft ends extend, and an annular drip flange projecting from each of the shaft ends adjacent the ball to deflect rain and snow driven into said enlarged openings, the diameter of the flanges being substantially greater than the diameter of said openings, the end walls of the lower part of the housing being provided with recesses extending radially outward from said openings for receiving the flanges for unrestricted movement therein, and the bottoms of said recesses having drains opening to the atmosphere, whereby rain and snow are prevented from entering the oil reservoir.

7. A ball and socket bearing comprising a bearing-housing adapted to be mounted on one end of a walking beam, the lower portion of the housing forming an oil reservoir provided with a ball-receiving socket, the wall of the socket having a groove therein extending radially inward from its periphery for supplying oil to the socket from the reservoir, a ball disposed in the socket, shaft ends projecting from diametrically opposite portions of the ball and adapted to support a vertically movable member below them, the end walls of the housing being provided with enlarged openings through which the shaft ends extend, and an annular drip flange projecting from each of the shaft ends adjacent the ball to deflect rain and snow driven into said enlarged openings, said end walls of the housing being provided with recesses extending radially outward from said openings for receiving the flanges for unrestricted movement therein, and the bottoms of the recesses having drains opening to the atmosphere, whereby rain and snow are prevented from entering the oil reservoir.

8. A ball and socket bearing comprising a bearing-housing the lower portion of which forms an oil reservoir provided with a ball-receiving socket adapted to be lubricated by oil in the reservoir, the end walls of the housing being provided with openings therethrough, a shaft loosely extending through said openings and projecting from both ends of the housing, a two-piece ball disposed in the socket and encircling the shaft, means for fastening the two parts of the ball together and to the shaft, and an annular drip flange projecting from each projecting portion of the shaft adjacent the ball to deflect rain and snow driven into said housing openings, said end walls of the housing being provided with recesses extending radially outward from said openings for loosely receiving the flanges for unrestricted movement therein, and the bottoms of the recesses having drains opening to the atmosphere, whereby rain and snow are prevented from entering the oil reservoir.

9. A self-aligning bearing for use with walking beams, comprising a bearing-housing the lower portion of which forms an oil reservoir provided with a raised ball-receiving socket spaced from the walls of the reservoir, the wall of the socket having a groove therein extending to the edge of the socket for admitting oil to the socket from the reservoir, a ball disposed in the socket, shaft ends projecting from diametrically opposite portions of the ball, the end walls of the housing being provided with enlarged openings through which the shaft ends extend, and an annular drip flange projecting from each of the shaft ends adjacent the ball to deflect rain and snow driven into said enlarged openings, said end walls of the housing being provided with recesses extending radially outward from said openings for receiving the flanges for unrestricted movement therein, and the bottoms of the recesses having drains opening to the atmosphere, whereby rain and snow are prevented from entering the oil reservoir.

CHARLES L. HENRY.